June 22, 1937.　　　　J. C. OLSEN　　　　2,084,536
BELT END FASTENER
Filed June 26, 1936
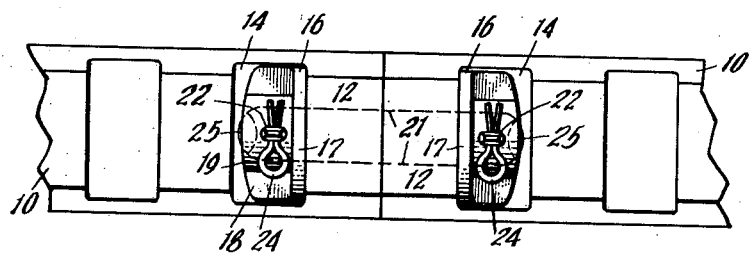
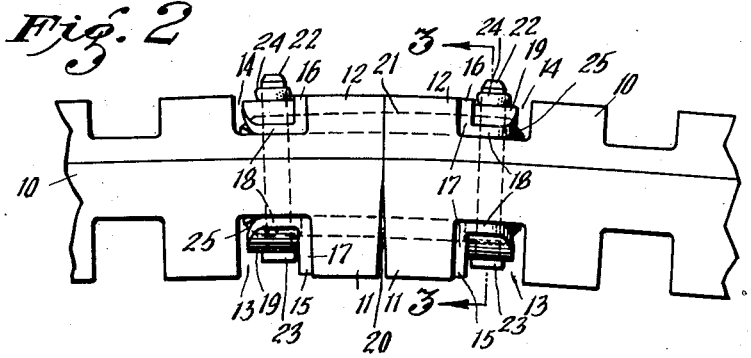
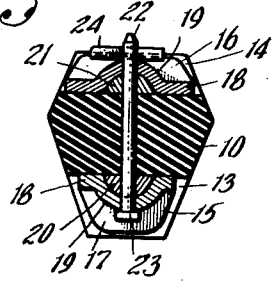
INVENTOR
John C. Olsen
BY Joseph Harris
his ATTORNEY Patented June 22, 1937

2,084,536

UNITED STATES PATENT OFFICE 2,084,536

BELT END FASTENER

John C. Olsen, Chicago, Ill., assignor to Flexible Steel Lacing Company, Chicago, Ill., a corporation of Illinois Application June 26, 1936, Serial No. 87,495

10 Claims. (Cl. 24—31)

This invention relates to improvements in belt end fastener and more specifically belt end fastener for connecting the ends of that type of side driving or V-belts having alternating lugs and recesses on either the inner side or both the inner and outer sides thereof.

One object of the invention is to provide a fastener of the class specified which is so constructed and applied to the belt ends as to transfer a substantial part of the pulling stresses to the lugs on the belt in such manner as to place the lugs in substantially direct shear immediately adjacent the main or body portion of the belt to thereby obtain maximum resistance against pulling out of the fastener or disruption of the belt.

Another object of the invention is to provide a belt fastener of such construction that, when applied to V-belts having lug or recess formation on both the inner and outer sides of the belt, all of the four lugs adjacent the joint will be placed under direct shear to thereby distribute the load to the belt in the most efficient manner.

Still another object of the invention is to provide a belt end fastener of the character indicated in the preceding paragraphs such that, in applying the same to the belt ends, the minimum amount of mutilation of the main or true load-transmitting part of the belt is necessary to thereby maintain the efficiency of the belt and insure long life thereof.

A more specific object of the invention is to provide a fastener of the type indicated wherein are employed inner and outer rigid links extended circumferentially through the adjacent end lugs of the belt ends in a plane flush with the respective inner and outer faces of the main load-transmitting portion of the belt in combination with backing or abutment plates against the lugs and retaining pins or elements entailing a minimum amount of slitting of the main portion of the belt.

Other objects of the invention will more clearly appear from the description and claims hereinafter following.

In the drawing forming a part of this specification, Figure 1 is a top plan view of the adjacent end portions of a V-belt showing the improvements applied thereto. Figure 2 is a side elevation of the structure shown in Figure 1. And Figure 3 is a vertical or radial sectional view corresponding to the line 3—3 of Figure 2.

In said drawing 10—10 indicate the end portions of a side driving belt adapted to be secured together by the improved fastener. The belt, as shown, is of that type sometimes known as a double V-belt wherein the sides are converged both radially outwardly and radially inwardly from the plane of the maximum width, as clearly shown in Figure 3. Said belt is provided with alternated lugs and recesses on both its inner and outer faces, considered radially of the belt, the endmost lugs being indicated at 11—11 on the inner side and 12—12 on the outer side. The corresponding adjacent endmost recesses are indicated at 13—13 on the inner side of the belt and 14—14 on the outer side thereof. In actual practice, in effecting a joint of the ends, the belt will preferably be so cut that the outer end lugs 12—12 will abut each other and the inner set of lugs 11—11 will be slightly spaced, say approximately $\frac{1}{16}$ of an inch, as best shown in Figure 2, for the purpose hereinafter described.

The improved fastener, as shown, preferably comprises four bearing or abutment plates, the inner two of which are indicated at 15—15 and the outer two at 16—16. While all four of said plates are of substantially the same general form, those references 15 on the inner side of the belt are narrower transversely of the belt than those on the outer side, as best shown in Figure 3 due to the inner portion of the belt being narrower than the outer portion and to insure that the plates 15 and 16 will entirely clear the side surfaces of the pulley grooves in which the belt is intended to run.

Each of the plates 15 and 16 is of generally angular formation with a flange 17 abutting the adjacent surface of the corresponding endmost lug 11 or 12 and with a bottom section 18 seated against the bottom surface of the corresponding recess. Each bottom section 18 is also provided with a rounded offset as indicated at 19—19 to accommodate between it and the adjacent bottom surface of the recess, one of the ends of the two tension-transmitting or connector links 20 and 21.

The links 20 and 21 of rigid construction are extended through suitable slits made in the end lugs 11 and 12 so located that the inner link 20 is flush with the bottom surfaces of the inner recesses 13 and the outer longer link 21 flush with the bottoms of the outer recesses 14, as clearly shown in Figures 2 and 3. To better accommodate the belt to the curvature of the pulleys while riding thereover, the links 20 and 21 are preferably curved on a long radius as best shown in Figure 2.

To retain the plates 15 and 16 in position and to transfer the pulling loads from the links 20 and 21 to said bearing or abutment plates, securing pins 22—22 are employed, the same being extended radially of the belt through suitable aligned openings in the rounded offsets 19—19 of the plates, said securing pins also passing through correspondingly aligned perforations in the ends of the links 20 and 21, as best shown in Figure 3. The securing pins, as clearly shown in the drawing, have shanks which are relatively narrow transversely of the belt and relatively elongated circumferentially of the belt with the edges of the shanks rounded. The pins 22 are retained in place preferably by having the pins headed at one end, the inner end as shown at 23, and by removable cotters 24 passed through holes provided in the outer extended ends of the pins. By employing the removable cotters, the number of parts of the fastener which would be destroyed in effecting a new joint to shorten the belt is reduced to a minimum.

In applying the improved fastener to the belt ends, the ends of the belt are first prepared by squaring off the ends as will be understood and then the end lugs are slitted circumferentially by a suitable tool flush with the bottoms of the recesses. The links are then entered through the slits, the ends of the links being rounded and tapered as indicated at 25 to facilitate the insertion thereof, after which the respective sets of plates are put in position and finally the securing pins passed through the main parts of the belt, the links and the plates. To facilitate the insertion of the pins, the belt may be prepared therefor by slitting the same, as will be understood.

With the construction as shown and described, it is evident that the tension or pulling loads transmitted from one end of the belt to the other end through the links 20 and 21 are in turn transferred to the securing pins 22, placing the latter under shear and then the load is transferred from the securing pins to the plates 15 and 16, also under shear. The load from the plates is in turn transferred from the latter to the lugs 11 and 12, the latter being placed in substantially direct shear flush with the bottoms of the recesses, that is, in line with the inner and outer surfaces of the main load-transmitting portions of the belt. Some of the load will also be transferred through the pins to the main portions of the belt. With such an arrangement, the endmost lugs are utilized to the maximum in transferring the pulling strains to the belt, thus minimizing the tendency of the securing pins to pull out and also minimizing any tendency of the belt to spread or swell laterally and which would thereby distort the cross section of the belt and interfere with its efficient operation. By forming the securing pins of the cross section described, there is no appreciable spreading of the belt to distort its shape as will be apparent.

In actual practice, the slots in the inner link 20 through which the pins 22 are passed, will be made slightly longer than the length of the pin shanks considered circumferentially of the belt, so as to allow a small amount of play between the pins 22 and the link 20. This construction combined with the fact that a slight space is left between the endmost lugs 11—11, as hereinbefore described, permits of a free flexing of the belt when passing over the pulleys, as will be understood.

All of the parts of the improved fastener may be manufactured at comparatively small expense since each is of relatively simple construction and the application of the belt may be effected easily, thus reducing the cost of both manufacture and application.

Various modifications may be made in details of construction, as for instance, in the number of links employed, their location, the number of securing pins and others. All such changes and modifications are contemplated, as come within the scope of the claims appended hereto.

What is claimed is:

1. In a fastener for the ends of a side driving belt having an alternated lug and recess formation on its inner and outer sides, the combination with abutment plates adapted to be seated in each of the endmost recesses of the belt ends and to bear against the endmost lugs; of securing elements adapted to be extended radially through the belt ends and the respective sets of plates; and a pair of links extending between and connected at their ends to said securing elements, said links being adapted to extend through the inner and outer sets of endmost lugs of the belt and positioned flush with the inner and outer surfaces of the main portion of the belt.

2. In a fastener for the ends of a side driving belt having alternated lug and recess formations on its inner and outer sides, the combination with four abutment plates each adapted to be seated in an endmost recess of a belt end and to abut the corresponding endmost lug; and a pair of rigid links cooperable with each set of abutment plates, said links being so disposed as to be adapted to extend through adjacent pairs of endmost lugs flush with the inner and outer surfaces of the main portion of the belt.

3. In a fastener for the ends of a side driving belt having alternating lug and recess formations on its inner and outer sides, the combination with plates each of angular formation adapted to be seated in the bottoms of the endmost recesses of the belt ends and to bear against the endmost lugs; of securing elements extending in a direction radially of the belt through the plates and adapted to pass through the main portions only of the belt; tension-transmitting means extending across the belt end joint; and means for transferring the tension from said tension-transmitting means ultimately to said angularly formed plates.

4. In a fastener for the ends of a side driving belt having alternated lug and recess formations on its inner and outer sides, the combination with plates each of angular formation adapted to be seated in the bottoms of the endmost recesses of the belt ends and to bear against the endmost lugs; of securing pins extending in a direction radially of the belt through the plates and adapted to pass through the main portions only of the belt; tension-transmitting means extending across the belt and joint; and means for transferring the tension from said tension-transmitting means ultimately to said angularly formed plates, said tension-transmitting means comprising rigid links embedded in the belt material.

5. In combination with a side driving belt having alternated lug and recess formation on the inner side thereof, a pair of abutment plates each located in one of the endmost of said recesses of the belt and bearing against the corresponding endmost lugs; securing elements extended radially through each of said plates and the main portions of the belt; and a rigid link connected at its ends to said elements and extending across the joint of the belt ends.

6. In combination with a side driving belt having lug and recess formations on both its inner and outer sides, four abutment plates each of angular formation and adapted to be seated in the bottom of an endmost recess in bearing relation to the corresponding end lug; a radially extending securing pin passed through each radially aligned pair of plates and the corresponding main portion of the belt in line with the endmost recesses; and a pair of rigid links, the links extending circumferentially of the belt flush with the inner and outer surfaces of the main portions thereof and through the adjacent end sets of belt lugs, the ends of said links being apertured to receive the securing pins therethrough.

7. In combination with a side driving belt having lug and recess formations on both its inner and outer sides, four abutment plates each of angular formation and adapted to be seated in the bottom of an endmost recess in bearing relation to the corresponding end lug; a radially extending securing pin passed through each radially aligned pair of plates and the corresponding main portion of the belt in line with the endmost recesses; and a pair of rigid links, the links extending circumferentially of the belt flush with the inner and outer surfaces of the main portions thereof and through the adjacent end sets of belt lugs, the ends of said links being apertured to receive the securing pins therethrough, said securing pins having shanks of relatively narrow cross section transversely of the belt and relatively elongated circumferentially of the belt.

8. In combination with a side diving belt having lug and recess formations on both its inner and outer sides, four abutment plates each of angular formation and adapted to be seated in the bottom of an endmost recess in bearing relation to the corresponding end lug; a radially extending securing pin passed through each radially aligned pair of plates and the corresponding main portion of the belt in line with the endmost recesses; and a pair of rigid links, the links extending circumferentially of the belt flush with the inner and outer surfaces of the main portions thereof and through the adjacent end sets of belt lugs, the ends of said links being apertured to receive the securing pins therethrough, each of said securing pins being headed at one end; and removable cotters extended through the unheaded ends of the pins for retaining the same in place.

9. In a fastener for the ends of a side driving belt having alternated lug and recess formations on its inner side, the combination with abutment plates adapted to be seated in and against the bottoms of the recesses and to bear against the endmost lugs of the belt ends; of securing elements extending radially through each of said plates and those main portions of the belt disposed in radial alinement with the recesses; and a link extending through said endmost lugs of the belt ends and connected at its ends to said elements.

10. In a fastener for the ends of a side driving belt having alternated lug and recess formations on both its inner and outer sides, the combination with abutment plates, each adapted to be seated in and against the bottom of a recess and to bear against the respective endmost lugs of the belt ends on both the inner and outer sides thereof; of securing elements extending radially through the respective sets of plates on each belt end and the corresponding alined main portions of the belt; and links extending through the inner and outer sets of endmost lugs of the belt ends, said links being connected at their ends to said elements.

JOHN C. OLSEN.